United States Patent [19]

Murakoshi et al.

[11] Patent Number: 4,783,703
[45] Date of Patent: Nov. 8, 1988

[54] TELEVISION FLICKER PREVENTING CIRCUIT WITH GAMMA VALUE CONVERSION PRIOR TO FIELD-TO-FRAME CONVERSION

[75] Inventors: Makoto Murakoshi; Hitoshi Hirobe, both of Kanagawa; Hiromasa Hino, Tokyo, all of Japan

[73] Assignee: Fuji Photo Film Co., Ltd., Kanagawa, Japan

[21] Appl. No.: 846,310

[22] Filed: Mar. 31, 1986

[30] Foreign Application Priority Data

Apr. 10, 1985 [JP] Japan .................................. 60-74503

[51] Int. Cl.⁴ .......................... H04N 9/80; H04N 5/92
[52] U.S. Cl. ..................................... 358/313; 358/32; 358/164; 358/213.11; 358/336; 360/11.1; 360/38.1
[58] Field of Search ............... 358/21 R, 32, 160, 164, 358/213.11, 310, 312, 313, 320, 335, 336, 337, 906, 909, 314; 360/9.1, 10.1, 10.3, 11.1, 38.1; 333/141

[56] References Cited

U.S. PATENT DOCUMENTS

| | | | |
|---|---|---|---|
| 4,027,333 | 5/1977 | Kaiser et al. | 360/11.1 X |
| 4,298,896 | 11/1981 | Heitmann | 360/11.1 X |
| 4,400,719 | 8/1983 | Powers | 358/21 R |
| 4,412,251 | 10/1983 | Tanaka et al. | 358/160 |
| 4,489,349 | 12/1984 | Okada | 358/164 X |
| 4,499,494 | 2/1985 | Dischert et al. | 358/164 |
| 4,605,951 | 8/1986 | Kuribayashi | 358/313 X |
| 4,641,202 | 2/1987 | Nakamura et al. | 360/11.1 X |
| 4,675,751 | 6/1987 | Yagi et al. | 360/10.1 |

Primary Examiner—Alan Faber
Assistant Examiner—W. R. Young
Attorney, Agent, or Firm—Abelman Frayne Rezac & Schwab

[57] ABSTRACT

In a field/frame conversion system in which a field signal recorded on a track of a recording medium is repeatedly reproduced, a field signal delayed by ½ horizontal scanning duration and a directly provided field signal are alternately selected by a switch at each vertical scanning duration, and one of the field signals is formed by an arithmetic mean of a signal delayed by 1 horizontal scanning duration and a directly provided signal, to provide a frame signal, a flicker preventing circuit device in a field/frame conversion comprises a circuit provided in a front stage of an arithmetic mean circuit of the field/frame conversion system for bringing a gamma value of the field signal to 1, and a gamma circuit provided in a rear stage of the arithmetic mean circuit for returning the gamma value of the field signal to its original value.

9 Claims, 7 Drawing Sheets

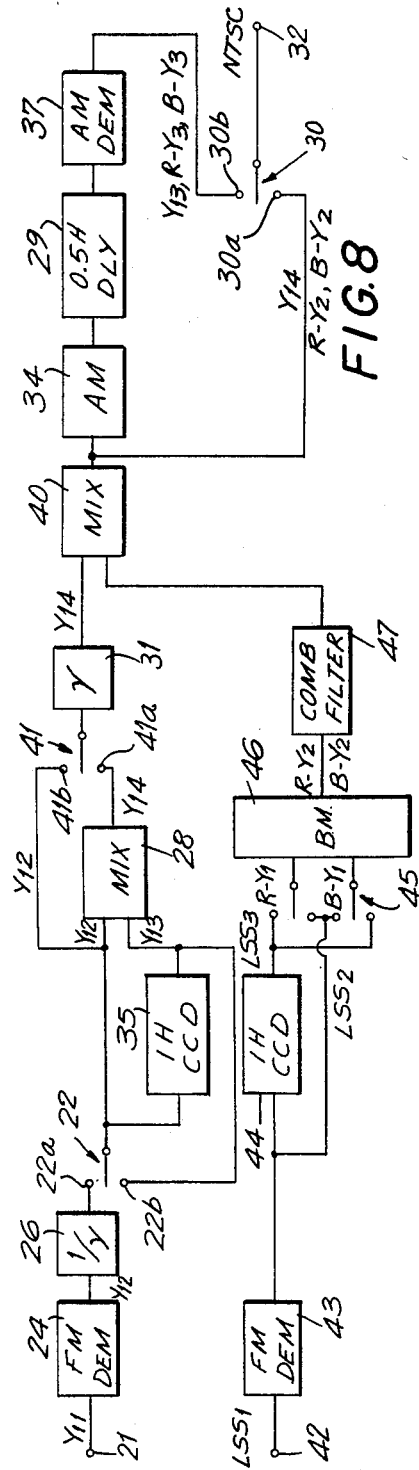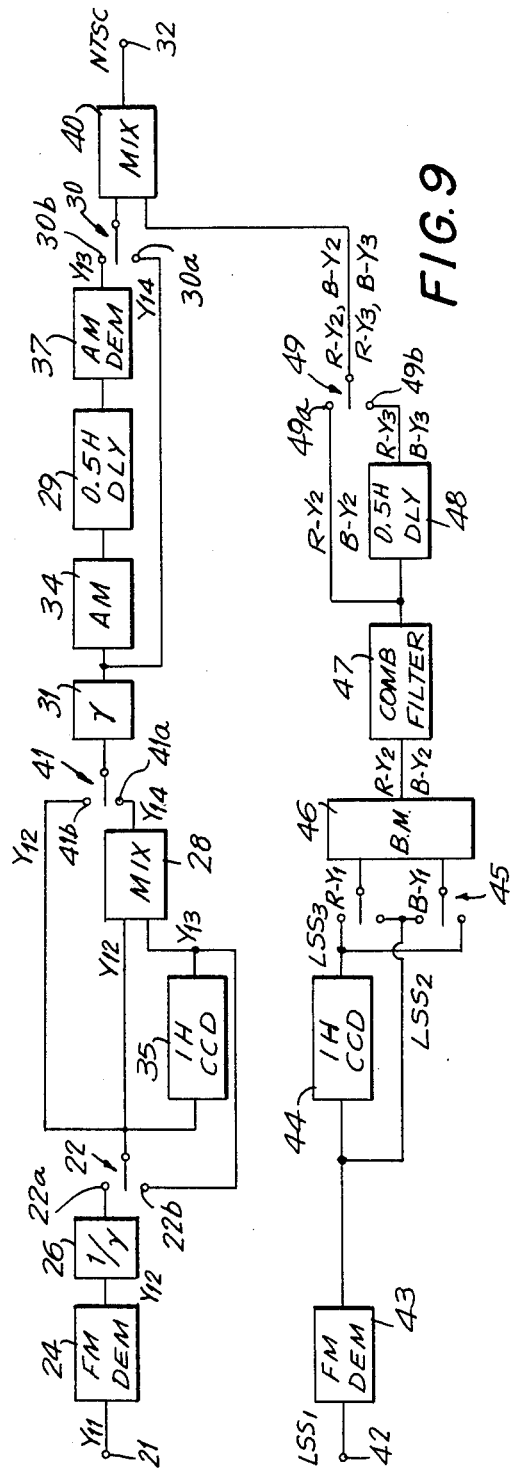

TELEVISION FLICKER PREVENTING CIRCUIT WITH GAMMA VALUE CONVERSION PRIOR TO FIELD-TO-FRAME CONVERSION

FIELD OF THE INVENTION

The present invention relates to a flicker preventing circuit for television in a field/frame conversion and, more particularly, is directed to a technique which enables the prevention of flicker on a cathode ray tube caused by a certain pattern when an arithmetic mean of luminance signals is taken to prevent V-jitter upon the field/frame conversion.

BACKGROUND OF THE INVENTION

In the scanning of a television cathode ray tube, and in order to reduce visible flicker, scanning is employed in which horizontal scanning lines are scanned at intervals of one or more lines. In general a [2:1] interlaced scanning is employed, and has been widely adopted. In the [2:1] interlaced scanning system, coarse pictures (fields) formed by a single vertical scan are overlapped with each other to form a single picture (frame). In the NTSC system, for example, the field repetition rate is 60 per second, the frame repetition rate is 30 per second, and one frame incorporates 525 horizontal scanning lines. In addition, odd numbered fields and even numbered fields are offset from each other at a starting point of the horizontal scanning by one-half of the horizontal scanning duration (H), i.e., 0.5H.

When a picture signal is recorded on a magnetic tape, or on a magnetic disc, or on other recording media, it is general to assign a signal of one field to none track, or, to assign a signal of one frame to one track. In addition, in the 1 field/1 track recording method, there is a so-called 1 frame/2 track recording method in which the odd and even fields are successively recorded, and, a field recording method in which only one of the odd and even fields is successively recorded.

In the reproduction of such field recordings, a so-called field/frame conversion system has been widely utilized iin which the same track is scanned twice to form a frame signal from a single kind of field signal. The aim principally is an improvement in recording density, which, in turn, enables an extended recording and an increase in the available number of still frames.

In case where conversion is made from a field signal to a frame signal, however, if the same field signal is merely repeated twice, it is not possible to realize interlaced scanning. The reason for this is that it is necessary for the scanning that the odd and even fields to be offset by 0.5H in time relation between the vertical synchronizing signal and the horizontal synchronizing signal. If the same field signal is merely repeated, the offset in time of 0.5H does not occur.

SUMMARY OF THE INVENTION

An object of the present invention is to provide a flicker preventing circuit for a cathode ray tube which can prevent flicker resulting from the utilization of an arithmetic mean of luminance signals in an interlaced scanning field/frame conversion.

According to the present invention, the field/frame conversion system employs a field signal delayed by one-half horizontal scanning duration, and an otherwise through field signal, which are alternately selected by switch means at each vertical scanning direction. One of the field signals is formed by an arithmetic mean of a signal delayed by one horizontal scanning duration and by an otherwise through signal, to provide a frame signal. The circuit includes a degamma circuit provided in a front stage of an arithmetic mean circuit of the field/frame conversion system for bringing a value of the field signal to one, and circuit provided in a rear stage of the arithmetic mean circuit for returning the value of the field signal to the original value.

BRIEF DESCRIPTION OF THE DRAWINGS

FIG. 1 through FIG. 9 are block diagrams respectively showing first to ninth embodiments of the present invention; and FIG. 10 through FIG. 14(a) and (b) are each illustrations of the prior art, in which;

FIG. 10 is a block diagram showing the principle of a field/frame conversion;

FIG. 11 shows a wave form representing a switch control signal illustrated in FIG. 10;

FIG. 12 is a block diagram showing the prior art in which an arithmetic means is taken in the field/frame conversion;

FIG. 13 is a graph showing characteristics of a cathode ray tube and the like; and FIG. 14(a) and FIG. 14(b) are diagrammatic views conceptually showing images reproduced by a circuit shown in FIG. 12.

DISCUSSION OF THE PRIOR ART

Figure 10:
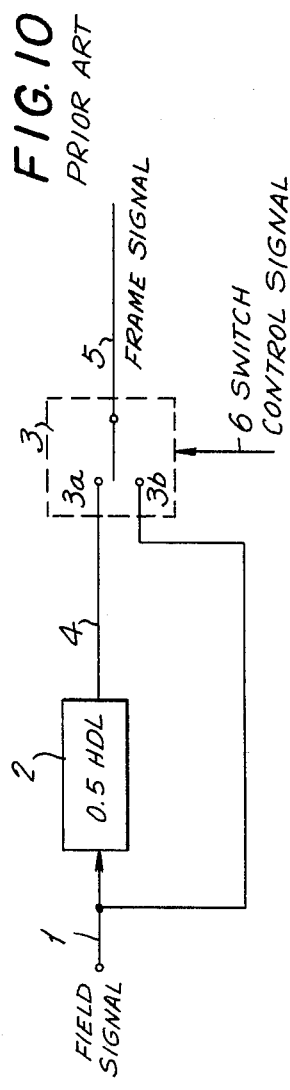

As explained hereinbefore, in the case where the conversion is made from the field signal to the frame signal, even if the same field signal is merely repeated twice, it is not possible to realize an interlaced scanning. As shown in FIG. 10, the field signal 1 is reproduced repeatedly and is caused to pass through a delay circuit 2 having a time delay of 0.5H. The through field signal 1 and the field signal 4 of 0.5H delay are alternately selected by a switch 3 at each vertical scanning duration (1V), to thereby convert the field signal 1 to the frame signal 5.

Figure 11:
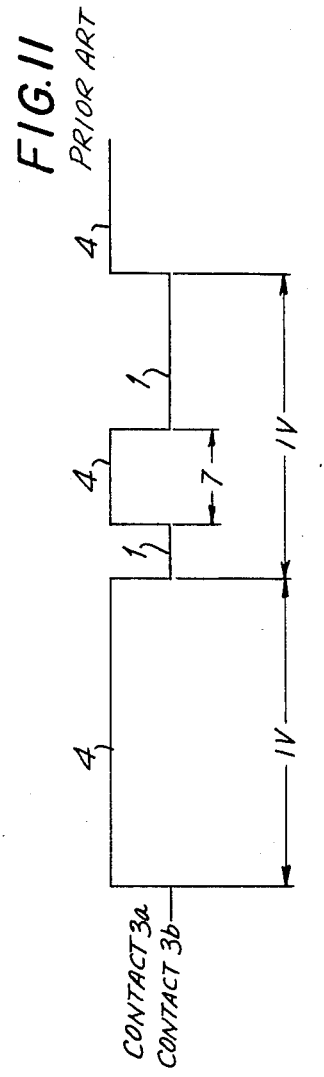

If the interval between the adjacent vertical synchronizing signals is offset from 1V by 0.5H, then, the selection of contacts 3a and 3b of the switch 3 is made, in a manner as shown in FIG. 11. Specifically, the field signal 4 of 0.5H delay is selected by a switch control signal 6 during a portion 7, between a front equalizing pulse section and a back equalizing pulse section, of a duration during which the through field signal 1 is selected. In order to convert the field signal to the frame signal, as shown in FIG. 10, a circuit is utilized which selects the through signal and the signal of 0.5H delay.

While it is possible to form the frame signal by interlaced scanning from a single kind of field signal, V-jitter of the image occurs in this case. V-jitter is a displacement of the image by the width of a single horizontal scanning line (1H) in the vertical direction (V-direction) repeated at the field cycle. That is, the image formed on the television screen is vibrated or oscillated upwardly or downwardly over the 1H width during each field cycle (1/60 second).

To prevent such V-jitter from occurring, it has been conventional to take an arithmetic mean of the luminance signals of the odd field, i.e. by adding the luminance signal delayed by a 1H duration to the through luminance signal, and, then dividing the sum by 2 to provide a luminance signal of the odd field.

Figure 12:
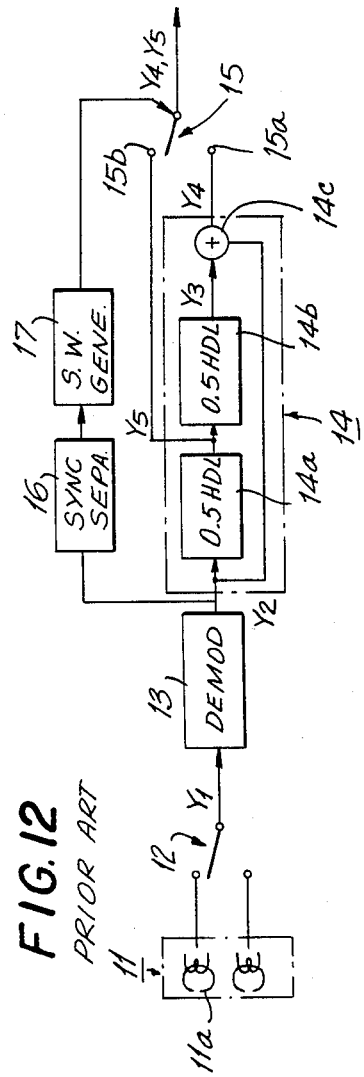

FIG. 12 is a block diagram illustrating the field/frame conversion system. In FIG. 12, the reference number 11 denotes an in-line double head having two magnetic heads 11a and 11b. The reference numeral 12 denotes a switch for selecting either one of the magnetic heads 11a and 11b. The reference numeral 13 denotes a demodulator for demodulating a carrier luminance signal Y1. The reference numeral 14 denotes an arithmetic mean circuit comprising two delay circuits 14a and 14b for delaying a demodulated luminance signal Y2 by 0.5H duration and an adding circuit 14c. The reference numeral 15 denotes a switch for switching the odd field and the even field. These components constitute a reproduction system for the luminance signal. In addition, the reference number 16 denotes a vertical synchronizing signal separating circuit, and the reference numeral 17 denotes a switching pulse generating circuit, these components forming a control system. The switching pulse generating circuit 17 generates switching pulses based on the vertical synchronizing signals separated by the circuit 16, so as to alternately switch the switch 15 at each 1V.

Thus, a contact 15a of the switch 15 is selected in the odd field, and a luminance signal Y4 is outputted as a signal comprised of the through luminance signal Y2, and a luminance signal Y3 delayed by 1H by the delay circuits 14a and 14b. The respective signals are added to each other by the adding circuit 14c, and, the sum thereof is divided by 2 to provide an arithmetic mean of the combined signals. In an even field, the contact 15b of the switch 15 is selected, and a luminance signal Y5 is outputtted as a signal comprised of the luminance signal Y2 delayed by 0.5H duration by the delay circuit 14A. In the luminance signal system, the luminance signal Y4 formed by the arithmetic mean, and the luminance signal Y5 delayed by 0.5H duration, are alternately outputted at each 1V.

As described above, a field/frame conversion performed to reproduce a picture signal by interlaced scanning provides an extremely effective manner of preventing the V-jitter. However, a new problem arises in that flicker occurs depending upon patterns, i.e., in a portion of the image which has no vertical correlation.

DESCRIPTION OF THE PREFERRED EMBODIMENTS

The present invention achieves the above object and further has for its object to eliminate flicker caused when the arithmetic mean is employed as described above.

Figure 13:
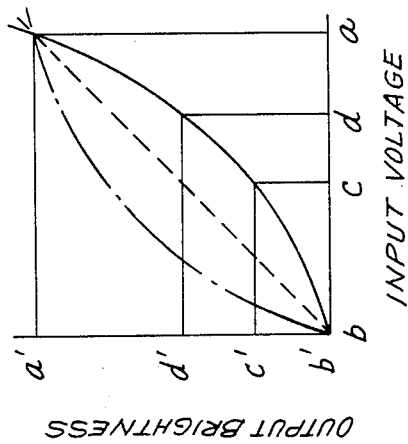

In general, a cathode ray tube used for the televsion has an inherent y (i.e., gamma) value which is ordinarily 2.2. That is, output brightness characteristics with respect to an input voltage of the cathode ray tube take the form as indicated by the solid line in FIG. 13. Accordingly, a gamma correction of y=0.45 as indicated by the dot-and-dash line in FIG. 13 is made oat the camera side so that the y characteristic of the cathode ray tube is cancelled and the image reproduced on the cathode ray tube is brought to y=1 as indicated by the broken line in FIG. 13.

On the basis of the characteristics shown in FIG. 13 and on the basis of FIGS. 6(a) and 6(b), consideration will now be made on a case where a pattern which comprises white and black lines each having width approximately equal to that of the scanning line and in which the white and black lines are alternately repeated is photographed, and a luminance signal in the picture signal based on the photograph is reproduced by the circuit shown in FIG. 12 and is supplied to a cathode ray tube of y=2.2.

Figure 14A:
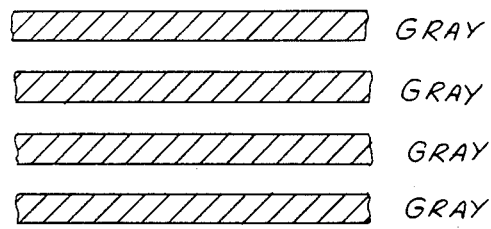

FIG. 14(a) shows a picture reproduced on a cathode ray tube in the odd field by use of the circuit shown in FIG. 12. FIG. 12(b) shows a picture reproduced on the cathode ray tube in the even field by use of the same circuit.

Figure 14B:
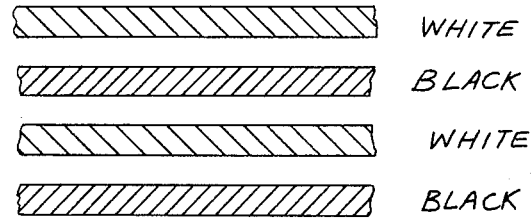

As shown in FIG. 14(a), since, with regards to the odd field, a signal is formed by using the arithmetic mean of the current luminance signal Y2 and the luminance signal Y3 before 1H is reproduced, a pattern comprising stripes all of which are gray is formed. As shown in FIG. 14(b), since the luminance signal Y5 formed by delaying the luminance signal Y2 by 0.5H is reproduced with regard to the even field, a pattern is formed comprising stripes, each of which is positioned between the adjacent gray stripes and which are alternately repeated in white and black.

The above discussed matters will now be considered as related to the characteristics curves shown in FIG. 13.

The input voltage in the odd field is a voltage at a point c (0.5) when the arithmetic mean is a voltage at a point a (10) corresponding to extreme white. The voltage at a point b (0) corresponds with extreme black. Accordingly, the output brightness of the cathode ray tube corresponding to the voltage at the point c becomes a point c'.

On the other hand, the input voltage in the even field is a voltage at the point a (10) corresponding to extreme white. The voltage at point b representing extreme black are supplied alternately at each 1H. Consequently, the extreme white of the outuput brightness a' corresponding to the voltage at the point a, and, the extreme black of the output brightness b', is sensed by the human eye as a brightness at a point d', i.e., a mean brightness of brightness a' and brightness b'. Thus, the human eye senses the brightness at the point c' in the odd field and the brightness at the point d' in the even field. It is believed that the difference in brightness between the point c' and d' causes the flicker to occur. Specifically, the brightness difference (d'-c') occurs in each field, and this is viewed by the human eye as flicker. This is believed to be due to the fact that the arithmetic mean of the luminance signals Y2 and Y3 has been taken, which signals are gamma corrected by y=0.45.

If the above described considerations are correct, it would then be possible to prevent the flicker from occurring. This would require the level of luminance signal Y4 (obtained by the arithmetic mean of the luminance signals Y2 and Y3 based on said white and black pattern) to be raised from the point c to the point d on the characteristic curve shown in FIG. 13.

In view of the above, the inventors of the present application have conducted experiments in which an amplifier is connected between the adding circuit 14c and the switch 15 of the circuit shown in FIG. 12, and the gain of the amplifier is varied to observe said white and black pattern reproduced on the cathode ray tube. The experimental results have revealed that when the level of the luminance signal Y4 is adjusted to the point d (0.7), the flicker ceases, and that flicker is observed when the level of the luminance signal Y4 is raised or lowered from the point d. Proceeding from these observations, it is proposed that a degamma bed made to the luminance signal to return it to y=1 and, that subsequently, the arithmetic mean be taken to again make the y correction.

The present invention will now be described in detail with reference to the accompanying drawings. FIG. 1 through FIG. 9 are block diagrams respectively showing first to ninth embodiments of the present invention. In the figures, like reference numerals are utilized to designate like parts and components, and repetitious description will be omitted for clarification and simplification.

Each of the embodiments is illustrated as being applied to a reproducing system employing field/frame conversion and interlaced scanning, and is basically arranged such that after a carrier luminance signal Y11 supplied to an input terminal 21 is demodulated, the luminance signal Y11 is caused to pass through a degamma circuit 26 to bring the y value of luminance signals Y12 and Y13 to 1. An arithmetic mean is taken with respect to the odd field and, subsequently, a gamma correction is again made by the y value which is an inverse number of the value to which the degamma is made. Consequently, the input signal and the output signal are each subjected to gamma correction as made by the same y value, and which is cancelled with the y characteristic of the cathode ray tube to produce an image of y=1 reproduced on the cathode ray tube. Specifically, since the input signal is ordinarily gamma corrected by y=0.45, the y value of the degamma circuit is 2.2, and the y value of the gamma circuit which makes the y correction to the output signal is 0.45 (1/2.2).

FIRST EMBODIMENT

Figure 1:
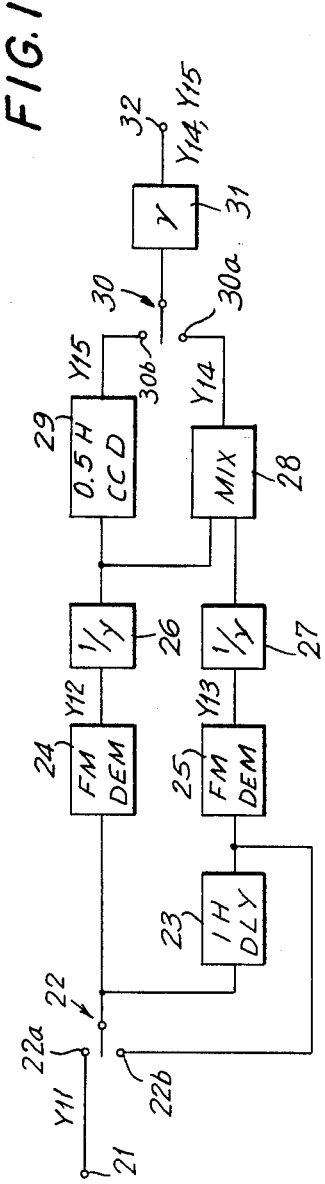

As shown in FIG. 1, this embodiment comprises FM demodulators 24 and 25 and separate degamma circuits 26 and 27. An 1H delay circuit 23 provided for taking an arithmetic mean also is capable of being utilized as a delay circuit for the compensation of drop-outs. When a drop-out is detected, a switch 22 is changed from a contact 22a to a contact 22b so as to select a signal from the delay circuit 23.

In this embodiment, the carrier luminance signal Y11 supplied through the input terminal 21 is directly supplied to the FM demodulator 24 and is supplied to the FM demodulator 25 through the 1H delay circuit 23, so as to respectively form luminance signals Y12 and Y13 of a baseband. The luminance signals Y12 and Y13 are subject to degamma by the degamma circuits 26 and 27 so that the y value is brought equal to 1, and then are supplied to an adding circuit 28 where the luminance signals are subjected to the arithmetic mean.

The luminance signal Y12 to which degamma has been made is also supplied to a 0.5H delay circuit 29. The delay circuit 29 utilizes a CCD (Charge-Coupled Device). Thus, it is possible to delay the signal of the baseband as it is. A switch 30 selects in contacts 30a and 30b alternately at each 1V. Specifically, in the odd field mode a luminance signal Y14 is selected to which the arithmetic mean made by the adding circuit 28 has been added. In the even field mode a luminance signal Y15 delayed by the 0.5H delay circuit 29 is selected. These luminance signals Y14 and Y15 are supplied through the switch 30 to a gamma circuit 31 where the gamma correction is made to the signals so that the y value is brought equal to 0.45. Subsequently, the signals are supplied to a cathode ray tube (not shown) through an output terminal 32.

SECOND EMBODIMENT

Figure 2:
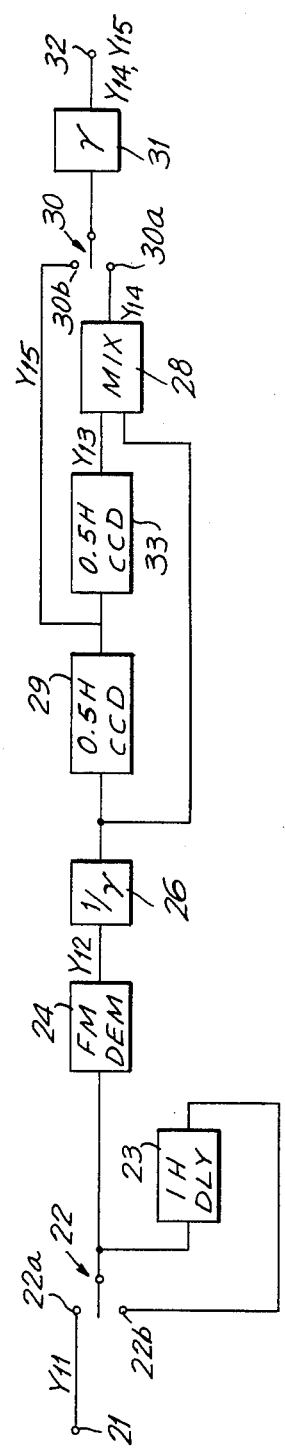

As shown in FIG. 2, this embodiment differs from the first embodiment in that the FM demodulator system is a single unit, and the 0.5H delay circuit 29 for forming the signal of the even field is a 1H delay circuit comprised of the 0.5H delay circuit 29 and a similar 0.5H delay circuit 33.

THIRD EMBODIMENT

Figure 3:
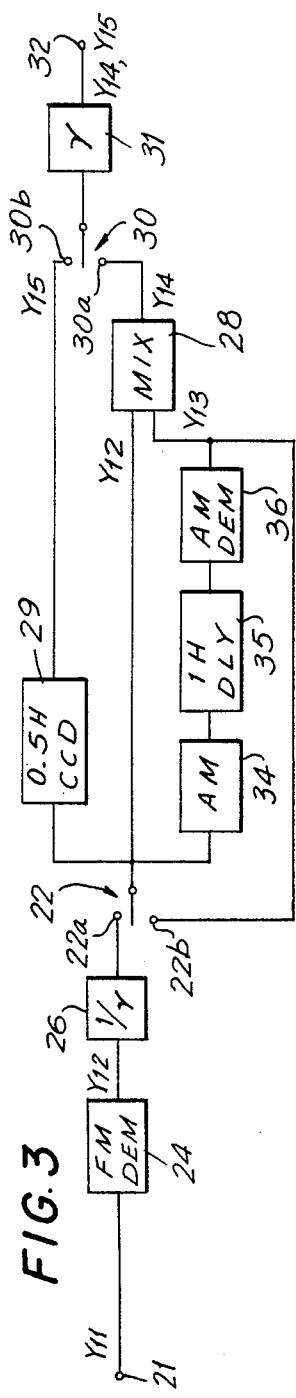

As shown in FIG. 3, this embodiment is arranged such that the switch 22, which is changed upon the detection of the drop-out, is connected to an output side of the degamma circuit 26, and an 1H delay circuit 35 formed as a glass delay is employed in common for taking the arithmetic mean and as a delay circuit for the compensation of drop-outs, and, as the delay circuit 35. Because of the glass delay, it is necessary to provide an AM modulator 34 in a front stage of the glass delay and an AM demodulator 36 in a rear stage thereof. The reason for this is that the glass delay has an inherent frequency band and is incapable of delaying the signal of the baseband, and it is required to convert the luminance signal Y12 to the above inherent frequency band. In this manner, in case where the glass delay is utilized, the delay is not affected by the surrounding temperature.

FOURTH EMBODIMENT

Figure 4:
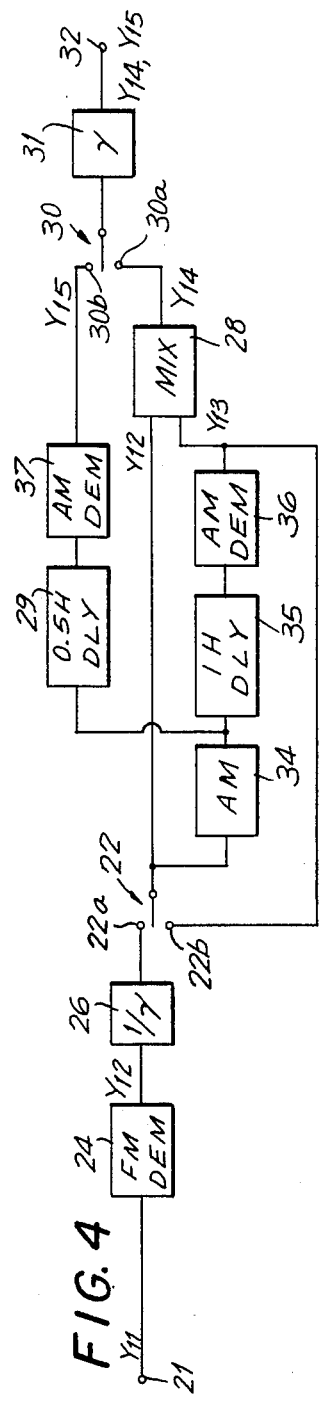

As shown in FIG. 4, this embodiment differs from the third embodiment in that the 0.5H delay circuit 29 for forming the signal of the even field is also formed by a glass delay, and therefore, the AM modulator 34 is used in common with the circuit 29 and the 1H delay circuit 35 (which is a similar glass delay), and an AM demodulator 27 is newly added.

FIFTH EMBODIMENT

Figure 5:
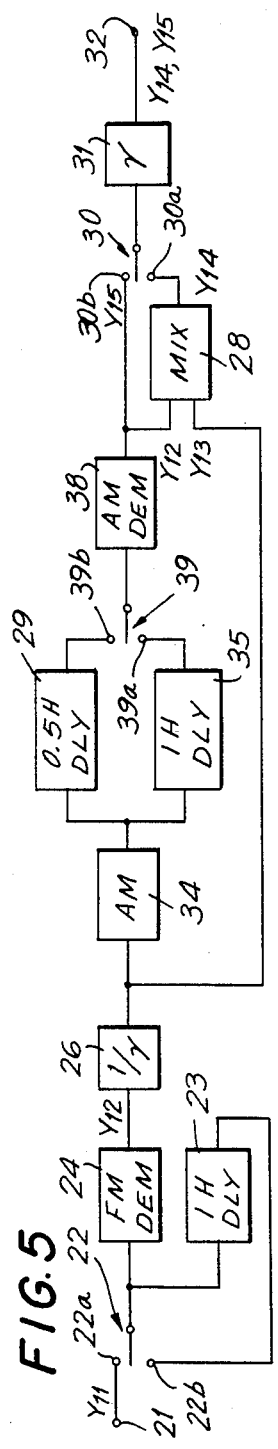

As shown in FIG. 5, this embodiment differs from the fourth embodiment in that an AM demodulator 38 is provided at the respective output sides of the 0.5H delay circuit 29, and the 1H delay circuit 35 is commonly used therein. A switch 39 is added which selects contacts 39a and 39b in synchronism with the switch 30, and the 1H delay circuit 23 for the compensation for drop-out is made independent similarly to the second embodiment.

SIXTH EMBODIMENT

Figure 6:
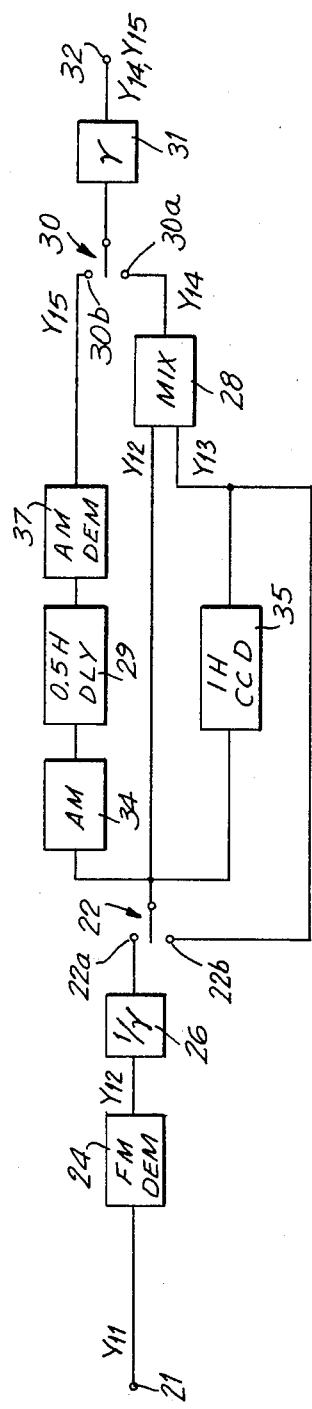

As shown in FIG. 6, this embodiment differs from the third embodiment in that the 0.5H delay circuit 29 for forming the signal of the even field is formed by a glass delay, and the 1H delay circuit 35 for taking arithmetic mean is formed by CCD.

SEVENTH EMBODIMENT

Figure 7:
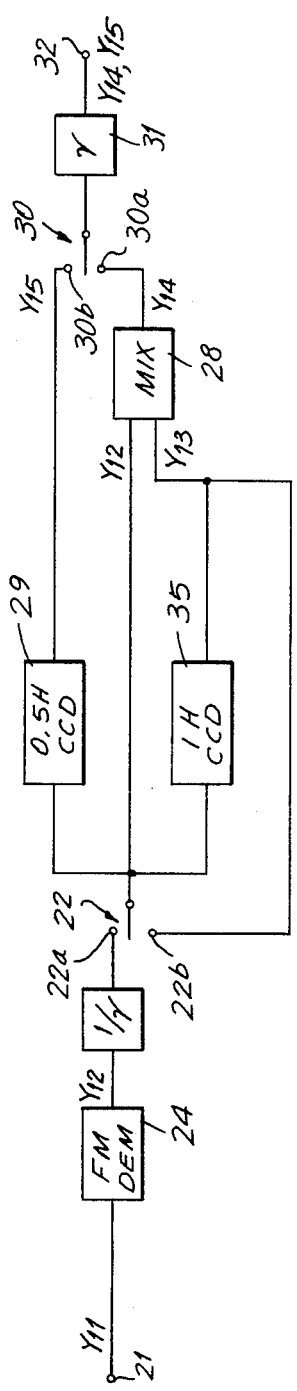

As shown in FIG. 7, this embodiment differs from the sixth emdodiment in that the 0.5H delay circuit 29 is also formed by CCD.

In the first to seventh embodiments described above, the processing system for a chrominance signal can be any conventinal system.

EIGHTH EMBODIMENT

As shown in FIG. 8, this embodiment includes a color signal processing system of color-difference line sequential system. After a color-difference signal to which a coincidence has been made and a luminance signal are mixed with each other by a mixer 40, signal selection is made as to the odd field and the even field. The eighth embodiment is different from the seventh embodiment in that the luminance signal processing system comprises a switch 41 which selects the luminance signal Y14 (signal of the odd field) to which the arithmetic mean is made, and, the luminance signal Y13 which has been passed through the degamma circuit 26 after the demodulation (signal which is delayed by 0.5H to become a signal of the even field). The switch 41 is interlocked with the switch 30 to select a contact 41a upon the odd field and a contact 41b upon the even field. In addition, the eighth embodiment is identical with the previously described embodiment in that since the 0.5H delay circuit 29 utilizes a glass delay, the AM modulator 34 is provided in a front stage of the delay circuit 29 and the AM demodulator 37 is provided in a rear stage of the same delay circuit 29. On the other hand, a carrier color-difference line sequential signal LSS1 of the color signal processing system is supplied to an FM demodulator 43 through an input terminal 42 and is formed into a color-difference line sequential signal LSS2 of the baseband. This color-difference line sequential signal LSS2 together with a color-difference line sequential signal LSS3 which is formed by delaying the signal LSS2 by an 1H delay circuit 44 is supplied to a coincident switch 45 and is subjected to coincidence thereby. The resulting two kinds of color-difference signals R-y1 and B-Y2 are supplied to a balanced modulator 46 and is modulated by a quadrature two-phase balanced modulation system so as to be brought to a chrominance signal component of the NTSC system. The resulting carrier color-difference signals R-Y2 and B-Y2 are supplied to the mixer 40 through a comb filer 47 and are mixed with the luminance signal Y14. In the odd field the switch 30 selects the luminance signal Y14 and the carrier color-difference signals R-Y2 and B-Y2 which are the output signals of the mixer 40, and in the even field the same switch 30 selects the luminance signal Y15 which is formed by delaying the output signal of the mixer 40 by the 0.5H and the color-difference signals R-Y3 and B-Y3. Thus, the standard signals of the NTSC system are issued from the output terminal 32. Incidentally, the comb filter 47 is provided for improving the respective gains of the carrier color-difference signals R-Y2 and B-Y2.

NINTH EMBODIMENT

As shown in FIG. 9, this embodiment is different from the eighth embodiment in that a 0.5H delay circuit 48 for forming the signal of the even field is provided independently from the luminance signal processing system. For this reason, a switch 49 is provided. The switch 49 is interlocked with the switches 30 and 41 such that the switch 49 selects a contact 49a in the odd field and selects a contact 49b in the even field.

Although, in the above-described first through ninth embodiments, the signal of the 0.5H delay system which is formed into the signal of the even field is supplied to the degamma circuit 26 and the gamma circuit 31, it is sufficient if the gamma and degamma processing are performed only with respect to the signals to which the arithmetic mean is taken, i.e., the signals of the odd field in this case. That is, it is possible to arrange the signal of the 0.5H delay system so as to bypass the degamma circuit 26 and the gamma circuit 31.

As described above in detail with reference to the various embodiments, according to the present invention, the luminance signal of one field is returned to y=1, and the arithmetic mean of the luminance signal and the signal before 1H is taken. Subsequently, y correction is made so as to be the luminance signal the original y value. In this manner, it is possible to prevent flicker resulting from the taking of the arithmetic mean in case where the field/frame conversion is performed by the interlaced scanning. Accordingly, the present invention is particularly useful when used in a still reproduction in which the same pattern is repeatedly reproduced.

What is claimed is:

1. A flicker preventing circuit for television, comprising:

degamma circuit means provided in a a front stage of arithmetic mean circuit means of a field to frame conversion system in which a field signal recorded on a track of a recording medium is repeatedly reproduced, a field signal delayed by one-half horizontal scanning duration and a directly provided through field signal are alternately selected by switching means at each vertical scanning duration, and one of the field signals is formed by an arithmetic mean of a field signal delayed by one horizontal scanning duration and an otherwise through field signal, to provide a frame signal, said degamma circuit means changing a gamma value of the reproduced field signal to one; and gamma circuit means provided in a rear stage of said arithmetic mean circuit means for returning the gamma value to its original value.

2. A flicker preventing circuit for television as defined in claim 1, including:

first switch means having a first contact supplied with a carrier luminance signal and a second contact supplied with a signal at an output side of a delay circuit for delaying the carrier luminance signal taken through said first contact by the one horizontal scanning duration, said first switch means selecting said second contact in a case where a dropout is detected and selecting said first contact in all other cases;

a first degamma circuit for bringing the gamma value of a luminance signal obtained by the demodulation of the carrier luminance signal, to one;

a second degamma circuit for bringing the gamma value of a luminance signal obtained by the demodulation of a signal formed by delaying the carrier luminance signal by said delay circuit by the one horizontal scanning duration, to one;

an adding circuit for adding respective output signals of said first and second degamma circuits to each other to take an arithmetic mean thereof;

second switch means having a first contact supplied with a signal formed by delaying the output signal of said first degamma circuit by the one-half horizontal scanning duration and a second contact supplied with the signal formed by the arithmetic mean by said adding circuit, said second switch means alternately selecting any one of said first and second contacts thereof at each vertical scanning duration; and gamma circuit for returning the signal selected by said second switch means to the original gamma value.

3. A flicker preventing circuit for television as defined in claim 1, including:

degamma circuit for bringing the gamma value of a luminance signal obtained by the demodulation of a carrier luminance signal, to one;

first switch means having a first contact supplied with an output signal of said degamma circuit and a second contact supplied with an output signal of a first delay circuit for delaying the signal taken through said first contact by the one horizontal scanning duration, said first switch means selecting said second contact in a case where a drop-out is detected and said first contact in all other cases;

an adding circuit for adding a luminance signal taken through said first switch means and a luminance signal formed by delaying the luminance signal taken through said first switch means by said first delay circuit to each other to take an arithmetic mean thereof;

a second delay circuit for delaying the luminance signal taken through said first switch means by the one-half horizontal scanning duration;

second switch means having a first contact supplied with the signal delayed by said second delay circuit and a second contact supplied with the signal formed by the arithmetic mean by said adding circuit, said second switch means alternately selecting any one of said first and second contacts thereof at each vertical scanning duration; and a gamma circuit for bringing the signal selected by said second switch means to the original gamma value.

4. A flicker preventing circuit for television as defined in claim 3, including:
said first delay circuit being formed by a glass delay;
a modulator provided in a front stage of said first delay circuit;
a demodulator provided in a rear stage of said first delay circuit; and
said second delay circuit being formed by a charge coupled device.

5. A flicker preventing circuit for television as defined in claim 3, including:
each of said first and second delay circuits being formed by a glass delay;
a common modulator provided in a front stage of said first and second delay circuits; and
separate demodulators respectively provided in respective rear stages of said first and second delay circuits.

6. A flicker preventing circuit for television as defined in claim 3, including:
said second delay circuit being formed by a glass delay;
a modulator provided in a front stage of said second delay circuit; and
a demodulator provided in a rear stage of said second delay circuit.

7. A flicker preventing circuit for television as defined in claim 1, including:
a degamma circuit for bringing the gamma value of a luminance signal obtained by the demodulation of a carrier luminance signal, to one;
a modulator for modulating an output signal of said degamma circuit;
a first delay circuit formed by a glass delay for delaying an output signal of said modulator by the one horizontal scanning duration;

a second delay circuit formed by a glass delay for delaying the output signal of said modulator by the one-half horizontal scanning duration;

first switch means having a first contact supplied with an output signal of said first delay circuit and a second contact supplied with an output signal of said second delay circuit, said first switch means alternately selecting any one of said first and second contacts at each vertical scanning duration;

a demodulator for demodulating an output signal of said first switch means;

an adding circuit for adding the output signal of said degamma circuit and an output signal of said demodulator to each other to take an arithmetic mean thereof;

second switch means having a first contact supplied with the output signal of said demodulator and a second contact supplied with a signal formed by the arithmetic mean by said adding circuit, said second switch means alternately selecting any one of said first and second contacts thereof at each vertical scanning duration in synchronism with said first switch means; and gamma circuit for returning the signal selected by said second switch means to the original gamma value.

8. A flicker preventing circuit for television as defined in claim 1, including:
a degamma circuit for bringing the gamma value of a luminance signal obtained by the demodulation of a carrier luminance signal, to one;

first switch means having a first contact supplied with an output signal of said degamma circuit and a second contact supplied with an output signal of a first delay circuit for delaying the signal taken through said first contact by the one horizontal scanning duration, said first switch means selecting said second contact in a case where a drop-out is detected and selecting said first contact in all other cases;

an adding circuit for adding a luminance signal taken through said first switch means and a luminance signal formed by delaying the luminance signal taken through said first switch means by said first delay circuit to each other to take an arithmetic mean thereof;

second switch means having a first contact supplied with the luminance signal taken through said first switch means and a second contact supplied with the signal formed by the arithmetic mean by said adding circuit, said second switch alternately selecting any one of said first and second contacts thereof at each vertical scanning duration;

gamma circuit for returning the signal selected by said second switch means to the original gamma value;

a mixer for mixing an output signal of said gamma circuit and a carrier chrominance signal to which a quadrature two-phase balanced modulation is made after the coincidence so as to be brought to a chrominance signal component of the National Television Systems Committee system, with each other; and third switch means having a first contact supplied with a signal formed by delaying an output signal of said mixer by the one-half horizontal scanning duration and a second contact supplied with the output signal of said mixer, said third switch means alternately selecting any one of said first and second contacts thereof at each vertical scanning duration in synchronism with said second switch means.

9. A flicker preventing circuit for television as defined in claim 1, including:

degamma circuit for bringing the gamma value of a luminance signal obtained by the demodulation of a carrier luminance signal, to one;

first switch means having a first contact supplied with an output signal of said degamma circuit and a second contact supplied with an output signal of a first delay circuit for delaying the signal taken through said first contact by the one horizontal scanning duration, said first switch means selecting said second contact in a case where a drop-out is detected and selecting said first contact in all other cases;

an adding circuit for adding a luminance signal taken through said first switch means and a luminance signal formed by delaying the luminance signal taken through said first switch means by said first delay circuit to each other to take an arithmetic mean thereof;

second switch means having a first contact supplied with the luminance signal taken through said first switch means and a second contact supplied with the signal formed by the arithmetic mean by said adding circuit, said second switch means alternately selecting any one of said first and second contacts thereof at each vertical scanning duration;

a gamma circuit for returning the signal selected by said second switch means to the original gamma value;

third switch means having a first contact supplied with a signal formed by delaying an output signal of said gamma circuit by the one-half horizontal scanning duration and a second contact supplied with the output signal of said gamma circuit, said third switch means alternately selecting any one of said first and second contacts at each vertical scanning duration in synchronism with said second switch means;

fourth switch means having a first contact supplied with a signal formed by delaying, by the one-half horizontal scanning duration, a carrier chrominance signal to which a quadrature two-phase balanced modulation is made after the coincidence so as to be brought to a chrominance signal component of the National Television Systems Committee system, and a second contact supplied with said carrier chrominance signal, said fourth switch means alternately selecting any one of said first and second contacts thereof at each vertical scanning duration in synchronism with said second and third switch means; and a mixer for mixing respective output signals of said third and fourth switch means with each other.

* * * * *